United States Patent [19]
Marcyan

[11] 3,858,836
[45] Jan. 7, 1975

[54] UNIVERSALLY ADJUSTABLE CANTILEVER BRACKET

[76] Inventor: Stanley T. Marcyan, 515 W. Windsor Rd., Glendale, Calif. 91204

[22] Filed: Aug. 29, 1973

[21] Appl. No.: 392,758

[52] U.S. Cl............ 248/278, 16/128 A, 33/172 R, 403/313
[51] Int. Cl....... E05d 15/00, G01b 3/22, A47f 5/00
[58] Field of Search............ 24/81 H, 81 PH, 81 PE; 16/DIG. 41, 128 A, 140; 248/DIG. 4, 229, 278; 33/172, 172 D, 172 R; 403/305, 309–313; 85/5 R

[56] References Cited
UNITED STATES PATENTS

| | | | |
|---|---|---|---|
| 1,582,898 | 5/1926 | Bobrow | 16/128 A |
| 1,616,935 | 2/1927 | Wales | 248/278 X |
| 2,472,431 | 6/1949 | Marcil | 33/172 R |
| 2,504,749 | 4/1950 | Stepacoff et al. | 16/128 A UX |
| 2,737,843 | 3/1956 | Koehl | 85/5 R |
| 3,361,515 | 1/1968 | Vanderbeek | 16/128 A X |
| 3,442,478 | 5/1969 | Parapetti | 33/172 D X |

FOREIGN PATENTS OR APPLICATIONS

| | | | |
|---|---|---|---|
| 589,563 | 12/1959 | Canada | 33/172 R |
| 23,575 | 11/1898 | Great Britain | 403/313 |

Primary Examiner—Donald A. Griffin
Attorney, Agent, or Firm—Sellers and Brace

[57] ABSTRACT

A universal cantilever bracket of general utility free of lost motion and self-clampable in any adjusted position. The bracket includes a plurality of serially connected friction joints individual ones of which have a hinge axis at right angles to the axis of another of said joints. At least one of the joints features a plurality of interleaving resilient fins which, prior to assembly are slightly deflected from others thereof in a transverse direction thereby to create sufficient frictional holding power in the assembled position of the hinge to retain the same in any adjusted position.

8 Claims, 6 Drawing Figures

PATENTED JAN 7 1975
3,858,836
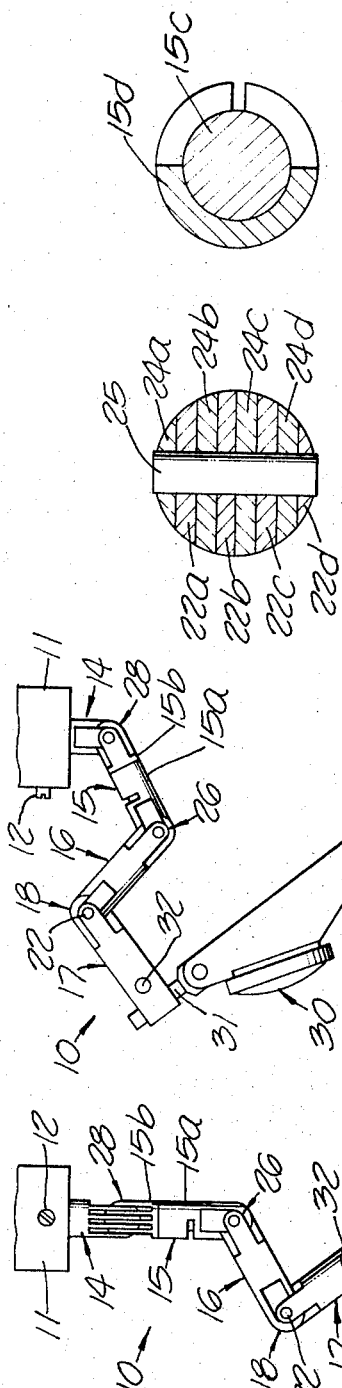
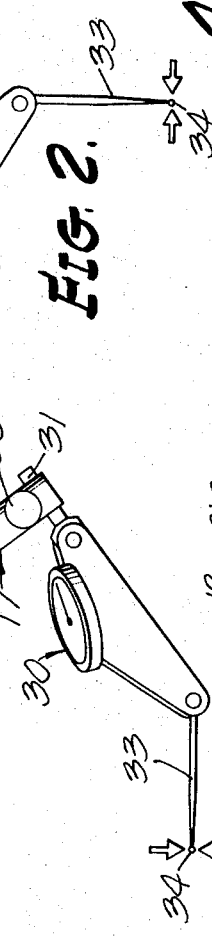
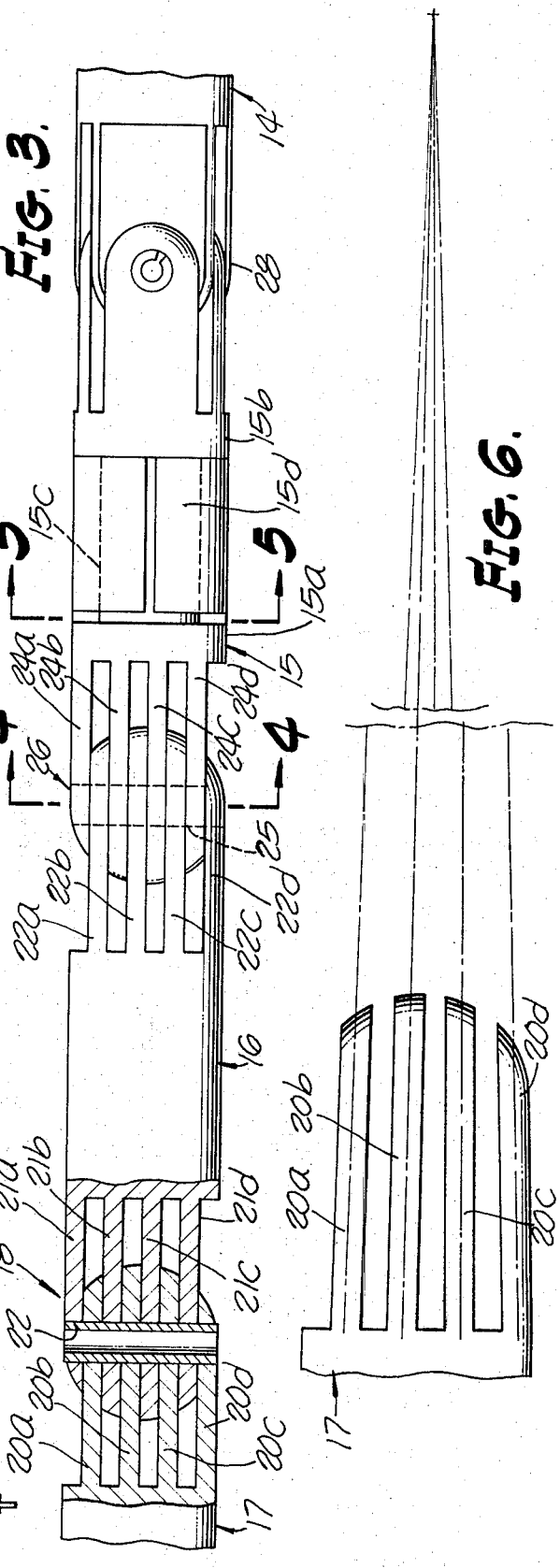

UNIVERSALLY ADJUSTABLE CANTILEVER BRACKET

This invention relates to cantilever brackets, and more particularly to a unique, universally adjustable bracket readily adjustable to any of a multiplicity of positions in each of which the bracket supports its design load in a firm and positive manner.

There are a multiplicity of bracket applications having need for a simple play-free, highly reliable, readily adjusted cantilever bracket which can be quickly readjusted to meet operating requirements. Various proposals have been made to meet these requirements but these proposals are subject to disadvantages and shortcomings sought to be obviated by the present invention. Not only have these prior constructions required an excessive number of accurately formed parts but they are costly to construct, service and maintain, and are lacking in the desired flexibility and versatility. Particularly serious has been the lack of a joint construction utilizing a minimum number of parts free of lost motion and play from end to end.

One of the many illustrative applications and operating environments for such brackets relates to the support of delicate, high precision, dial indicator instruments. Such instruments must be rigidly and immovably supported while in use without the slightest possiblity of movement or vibration being imparted thereto to disturb its indicator or its sensitive probe. At the same time it is of prime importance that the instrument support have wide-ranging adjustment capabilities achieved with a minimum of effort and time. The bracket provided by this invention fulfills these requirements in a highly satisfactory manner.

The invention bracket comprises a plurality of simple, readily machined components serially interconnected by a plurality of hinge joints preferably integral with the individual components. The friction hinge joints are of two types the one being a rotary shank and sleeve joint and the other comprising interleaving fins of resilient material held slightly deflected while assembled, thereby to provide sufficient frictional interference to hinging movement to support the design load without risk of change from its adjusted position. The axes of the two hinge types are at right angles to one another thereby providing universal hinging capabilities. The interleaved fins are confined to rotation about a preselected axis without play by an expanding roll pin having a friction fit with the associated fins thereby providing further assurance against lost motion between the hinge parts. One end of the bracket is readily clampable to a rigid support and the other includes means for clamping an instrument or other object to be supported. The bracket is quickly and readily adjusted to any new position by forcibly manipulating any one or more of its hinge joints.

It is therefore a primary object of the present invention to provide a unique and improved readily adjusted self-clamping cantilever bracket.

Another object of the invention is the provision of a universal self-clamping cantilever bracket having a plurality of friction joints each forcibly adjustable to a selected new position and reliably effective to support a design load without play or change in the adjusted position of any of its component parts.

Another object of the invention is the provision of an improved, manually adjustable, cantilever bracket and method of supporting a load firmly, positively and without lost motion or risk of change of position of the free end thereof relative to its fixed end.

Another object of the invention is the provision of a self-clamping universal cantilever bracket having a plurality of serially-connected friction joints manually adjustable to different positions and wherein all hinge joints remain firmly in an adjusted position by reason of frictional interference created as an incident to the initial assembly of the joint parts.

These and other more specific objects will appear upon reading the following specification and claims and upon considering in connection therewith the attached drawing to which they relate.

Referring now to the drawing in which a preferred embodiment of the invention is illustrated:

FIG. 1 is a vertical elevational view of an illustrative embodiment of the invention bracket shown supporting a dial indicator instrument with its probe poised to detect the slightest change to forces acting in the vertical plane;

FIG. 2 is a view similar to FIG. 1 but showing the invention bracket readjusted to support the same dial indicator with its probe positioned to detect a change of forces acting in a horizontal plane;

FIG. 3 is a fragmentary plan view on an enlarged scale of the two types of hinge joints employed in the bracket with parts broken away to show constructional details;

FIG. 4 is a cross-sectional view taken along line 4—4 on FIG. 3;

FIG. 5 is a cross-sectional view taken along line 5—5 on FIG. 3; and

FIG. 6 is a fragmentary view on an enlarged scale of one end of a hinge joint showing the natural relaxed position of the resilient fins prior to assembly to the mating hinge components.

Referring initially more particularly to FIGS. 1 and 2, there is shown a preferred embodiment of the invention cantilever bracket, designated generally 10, having one end rigidly anchored to a fixed support 11, as by a set screw 12. As there shown by way of example, bracket 10 comprises four principal components 14, 15, 16 and 17 arranged in series and hingedly connected together by unique self-clamping hinge means. Members 14, 15, 16 and 17 are generally similar to one another but differ in respects which will now be described.

Referring to FIG. 3, it is pointed out that bracket members 16,17 include a hinge knuckle 18 formed by a plurality of long, resilient, wide but relatively thin fins 20a, 20b, 20c, 20d interleaved with similar fins 21a, 21b, 21c, 21d projecting from the adjacent end of bracket member 16. The interleaved fins are held pivotally assembled by an expandable resilient split roll pin 22 having a snug fit in aligned openings through the interleaved fins.

It will be understood that knuckle 26 interconnecting the adjacent ends of members 15 and 16 likewise are interleaved and interconnected by a hinge knuckle 26 comprising fins 22a, 22b, 22c, 22d interleaved with the similar fins 24a, 24b, 24c, 24d and held assembled by a roll pin 25.

At least one of the bracket members, as 15, includes a second type of friction hinge joint having an axis extending lengthwise thereof and formed of members 15a, 15b. The right hand end of member 15a is provided with a cylindrical shank 15c which is smoothly and accurately finished and seats snugly within the similarly finished split cylindrical sleeve portion 15d coaxial of the left hand end of member 15b. As is made clear by FIG. 5, sleeve 15d is integral with member 15b only about a portion of its circumference, the remainder of its circumference being severed and free to contract and frictionally grip shank 15c of member 15a.

It will be understood that hinge knuckle 28 pivotally interconnecting members 14 and 15 is identical in construction with knuckles 18 and 26 and for this reason need not be further described.

Referring now to FIG. 6 there is shown an enlarged view of the right hand end of bracket member 17 in readiness for assembly in interleaving relationship to the fins of member 16. It will be understood that the fins of all bracket members as herein shown are machined from solid stock to very close tolerances. Preferably the slots between adjacent fins have a width corresponding to but slightly less than the thickness of the individual fins. The opposed faces of the slots are accurately finished or polished so as to have a smooth fit with the similar surfaces of the mating fin members. The ends of the fins are also preferably rounded so as to have the same radius relative to the axis of the pivot pin 22, thereby assuring the absence of sharp and protruding edges in different adjusted positions of the assembled joint.

Prior to the interleaving assembly of the individual hinge joints the fins of at least one of the bracket members, and preferably both, are deflected slightly either toward or away from the longitudinal axis of the member. As shown in FIG. 6, the pair of fins 20a,20b and the pairs of fins 20c,20d are deflected toward one another from the opposite sides of the longitudinal axis of member 17. This deflection may be of the order of a few ten thousandths of an inch. Since all parts of the bracket are preferably formed of resilient high strength material, such as tool steel, very substantial frictional forces are generated between the juxtaposed surfaces of the fins when they are forcibly interleaved with one another and secured in assembled position by the hinge pins. Although the fins have been described as deflected toward one another in FIG. 6, it will be understood that they may be deflected away from one another or in some other pattern selected to create effective frictional forces between the juxtaposed surfaces of the fins when assembled in interleaving relationship.

The portions of the slit sleeve 15d (FIG. 5) likewise may be deflected inwardly toward the axis of the sleeve prior to assembly to shank 15c. Accordingly, the forced assembly of the shank into the sleeve creates strong frictional forces effective to retain components 15a,15b in any adjusted position about the longitudinal axes of shank 15c and sleeve 15d.

Referring now to FIGS. 1 and 2, bracket 10 is shown supporting a dial indicator 30 having a supporting shank 31 held clamped by a thumb screw 32 in an opening extending transversely of the end of bracket member 17. The dial indicator is provided with a pivoting probe 33 having a sensor sphere 34 at its outer end. FIG. 2 on the other hand, shows cantilever bracket 10 readjusted to support probe 33 of dial indicator 30 in a vertical plane with the sensor at its outer end properly positioned to detect changes in a horizontal plane in the direction indicated by the two opposed arrows. It will be observed that knuckles 18 and 28 have been adjusted and that joint 15 has been rotated 90° about its longitudinal axis. All adjustments of either the hinging or the rotary type of joint are made manually by grasping the two hinge members sought to be adjusted and shifting these in the desired amount and direction. The force required is substantial and very much greater than the forces normally acting on any joint by reason of the load supported on the outer end of the bracket. The frictional forces acting between the knuckle members safeguards against any lost motion of free play in all directions and both types of joints are devoid of lost motion or slack at all times and in all positions.

While the particular universally adjustable cantilever bracket herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A self-clamping adjustable hinge assembly comprising first and second hinge members of resilient material each having a plurality of elongated wide flat-surfaced resilient fins projecting therefrom and adapted to have a snug interleaving fit and cooperating with one another to form a hinge knuckle adequate to transmit a desired load without clamping the position of said fins relative to one another, the fins on at least one of said hinge members being slightly inclined to one another and to the longitudinal axis of said one hinge member, the hinge pin means having a snug fit within aligned openings transversely of the thickness of said interleaved fins and about the axis of which said first and second members are movable through a planar arc of less than 360°.

2. A hinge assembly as defined in claim 1 characterized in that the fins on both of said hinge members are slightly inclined to one another and to the longitudinal axis of the associated one of said first and second hinge members.

3. A hinge assembly as defined in claim 1 characterized in that the width of the slots between adjacent fins on each of said hinge members is substantially identical with the thickness of the fins on the other of said hinge members.

4. A self-clamping universally adjustable cantilever bracket assembly, said assembly comprising an elongated bracket having a first end adapted to be anchored to a support for said assembly and a remote free second end adapted to move universally about said first end, said elongated bracket having a plurality of relatively movable members including at least a first and a second friction hinge joint extending at right angles to one another, said first hinge joint comprising a plurality of interleaving flat-surfaced fins of resilient material and the fins of which are required to be slightly deflected transversely of the thickness thereof to effect the interleaving assembly thereof, snug fitting pin means assembled through aligned openings transversely of said interleaved fins, and the second of said hinge joints comprising a cylindrical shank on one of said bracket parts having a friction fit in a split ring socket having an axis at right angles to the axis of said first friction hinge joint.

5. A cantilever bracket as defined in claim 4 characterized in the provision of a plurality of said hinge joints at spaced-apart points along the length of said bracket.

6. A cantilever bracket as defined in claim 4 characterized in that the surfaces of said fins in contact with one another are smooth and in firm frictional engagement so as to remain positively in any adjusted position until forcibly shifted to another position about the axis of the associated pin means.

7. A bracket as defined in claim 4 characterized in the provision of means at the free end thereof for clamping thereto an article to be supported.

8. That improvement in a universal support for a dial indicator which comprises, a cantilever bracket having means at one end for securing the same to a support, and means at its free end for securing a dial indicator thereto, said bracket including a plurality of friction hinge joints arranged in series with one another between the opposite ends thereof arranged to pivot about axes at right angles to one another free of lost motion and including an axis longitudinally of said bracket and an axis transversely of the length thereof, and said transverse axis hinge joint including a plurality of interleaved fins of resilient material which are slightly non-parallel to one another prior to the forced interleaving assembly thereby to impart a snug frictional fit between their juxtaposed surfaces effective to retain the same firmly in a selected adjusted position, snug-fitting pivot pins means extending through said interleaved fins, and said longitudinal axis hinge joint comprising a snug-fitting resilient split sleeve and cylindrical shank assembly relatively adjustable about the common longitudinal axes thereof.

* * * * *

UNITED STATES PATENT OFFICE
CERTIFICATE OF CORRECTION

PATENT NO. : 3,858,836
DATED : January 7, 1975
INVENTOR(S) : Stanley T. Marcyan

It is certified that error appears in the above-identified patent and that said Letters Patent are hereby corrected as shown below:

Column 4, line 27, "clamping" should read --changing--.

Signed and Sealed this second Day of September 1975

[SEAL]

Attest:

RUTH C. MASON
Attesting Officer

C. MARSHALL DANN
Commissioner of Patents and Trademarks